United States Patent [19]
Stanbank et al.

[11] 3,856,696
[45] Dec. 24, 1974

[54] COMPOSITIONS CONTAINING DITHIONITES

[75] Inventors: Derek James Stanbank, Leeds;
Roland Albert Leigh, Harrogate;
Geoffrey Moorhouse Gibson, Leeds,
all of England

[73] Assignee: The British Oxygen Company Limited, London, England

[22] Filed: Oct. 26, 1972

[21] Appl. No.: 301,028

[30] Foreign Application Priority Data
Oct. 26, 1971   Great Britain.................... 49707/71
Apr. 12, 1972   Great Britain.................... 16893/72

[52] U.S. Cl................... 252/188, 252/8.6, 252/192, 8/110
[51] Int. Cl.............................................. C09k 3/00
[58] Field of Search.......... 252/188, 192, 8.6; 8/110

[56] References Cited
UNITED STATES PATENTS
3,353,909   11/1967   Janson et al.................... 252/188 X
3,773,679   11/1973   Kise et al............................ 252/188

*Primary Examiner*—Stephen J. Lechert, Jr.
*Attorney, Agent, or Firm*—Flynn & Frishauf

[57] ABSTRACT

A substantially anhydrous and homogeneous composition consisting essentially of a dithionite selected from sodium, potassium and calcium dithionites and from 0.1 to 10% by weight in said composition of an unsaturated carboxylic acid or an anhydride thereof. Preferred acids are aryloxy alkanoic acids of formula $ArORCO_2H$ wherein Ar is a substituted or unsubstituted aryl group and R is a substituted or unsubstituted methylene or polymethylene group. Most preferred is phenoxyacetic acid. Such acids may exhibit enhanced effectiveness over previous stabilizers.

18 Claims, No Drawings

COMPOSITIONS CONTAINING DITHIONITES

This invention relates to compositions comprising a metallic dithionite, particularly sodium dithionite.

Aqueous solutions of dithionite are used extensively in the textile and pulp and paper industries as bleaching agents, as reducing agents for vat dyes and as means of destroying dyes containing azo links. The dithionite is normally stored as a solid until required. Commercially available powdered anhydrous sodium dithionite is stable for long periods in dry air but undergoes decomposition in the presence of water or water vapour. The action of water is initially to form the dihydrate of the dithionite with the liberation of heat. The dihydrate is particularly readily oxidised by atmospheric oxygen, again exothermically. If the heat liberated in these two reactions is not removed rapidly enough a third exothermic reaction may occur, namely, the spontaneous decomposition of the salt with the disengagement of sulphur dioxide and the formation of thiosulphate, bisulphite and sulphur. The heat liberated during these reactions may be so great that the termperature of the decomposing compositions rises above the ignition point of sulphur, so that the composition finally begins to burn. Since dithionites are often used in environments of high humidity this tendency to ignite is a serious problem which has in fact given rise to a number of fires in dye-houses and pulp-mills.

It is known to reduce the ignitability of dithionites by admixture of additives. A wide diversity of such stabilising additives is known although the extent of the stabilising effect may vary considerably and no theory has yet been advanced to satisfactorily explain either the nature or the variation in degree of the stabilising effect. Therefore no prediction of stabilising ability is generally possible.

This may be seen from the varied nature of the previously suggested additives. Thus, U.S. Pat. No. 1,810,664 suggests the use of a saponifiable coating agent together with alkali which removes the coating by hydrolysis on addition to water; possible coating agents include metal soaps, sulphonated soaps and sulphonated fatty acids. U.S. Pat. No. 3,054,658 recommends sodium or potassium salts of $C_1$ to $C_{10}$ alkanoic acids or sodium or potassium benzoates. U.S. Pat. No. 3,468,623 states that suberic, azelaic or sebacic acids or salts thereof may be used. It is therefore clear that ability to stabilize dithionites is highly specific to individual compounds or small classes of compounds and that even closely similar compounds or homologues may differ markedly in their effectiveness.

We have now discovered a further class of materials capable of stabilising dithionites in small quantities under extreme conditions. The present invention provides a substantially anhydrous composition comprising a major proportion of a metallic dithionite and an unsaturated carboxylic acid or an anhydride of such acid. Unsaturated carboxylic acids are herein defined as those containing at least one carboncarbon double bond. Such unsaturated carboxylic acids include both aliphatic unsaturated, aromatic and aryloxy alkanoic acids. The aromatic acids are defined as those containing at least one six-membered homocyclic aromatic nucleus with at least one carboxyl group attached thereto. The acid may preferably be a monocarboxylic acid such as benzoic, salicyclic or naphthoic acid or a dicarboxylic acids such as phthalic acid and isophthalic acid. 1,4 substituted dicarboxylic acids such as terephthalic acid are less preferred. Tri- and higher substituted dicarboxylic acids are again less preferred. Acid anhydrides such as phthalic anhydride may also be used. Most preferred are mononuclear monocarboxylic acids and benzoic acid itself has been found especially effective.

Unsaturated aliphatic acids which may be employed include maleic and fumaric acids and maleic anhydride.

Aryloxy alkanoic acids for use according to the invention have the general formula $ArORCO_2H$ where Ar is a substituted or unsubstituted aryl group and R is a substituted or unsubstituted methylene or polymethylene group. Preferred aryloxy groups include phenoxy; chlorophenoxy, e.g. o- p- or m-chlorophenoxy; dichlorophenoxy, e.g. 2,4-dichlorophenoxy; trichlorophenoxy, e.g. 2,4,5-trichlorophenoxy; 4-chloro-2-methyl phenoxy;naphthoxy. Other subsituent groups which may be present in the groups Ar include nitro, methyl, ethyl, isopropyl, cyano, carboxy, carbalkoxy and bromo groups.

Preferred groups R include substituted or unsubstitued methylene, ethylene and trimethylene groups.

Particularly preferred aryloxy alkanoic acids which have exceptional utility and are capable of conferring appreciable stabilisation in smaller amounts than are necessary with previously suggested stabilisers include phenoxyacetic acid; 4-chlorophenoxyacetic acid; 4-chloro-2-methylphenoxyacetic acid; 2,4-dichlorophenoxyacetic acid; 2,4,5-trichlorophenoxyacetic acid; 1- and 2-naphtoxyacetic acid; 2-phenoxypropionic acid; 2-(4-chlorophenoxy) propionic acid; 2-(4-chloro-2-methylphenoxy) propionic acid; 2-(2,4--dichlorophenoxy) propionic acid; 2-(2,4,5-trichlorophenoxy) propionic acid; 4-(4-chloro-2-methylphenoxy)-n-butyric acid; 4-(2,4-dichlorophenoxy)-n-butyric acid.

The preferred stabilisers are those which have melting points below 120°–130°C or alternatively those which are soluble in saturated aqueous solutions of dithionite salts at that temperature. (The stabilisers are generally soluble in water itself). 120°–130°C is the temperature range in which dithionites appear to initiate the principal exothermic reaction leading to their decomposition. Whether or not a particular acid or anhydride falls within a preferred category may readily be determined by simple experiment.

Compositions of the invention have substantial stability to decomposition in the presence of humid air even at concentrations of carboxylic acid down to as little as 0.1% by weight on the compositions. This effect is remarkable since it would have been expected that acids would rather accelerate decomposition it being known that dithionites in aqueous solution are less stable to decomposition under acid conditions than under neutral or alkaline conditions.

The quantity of stabilizer employed in the novel compositions will depend upon its effectiveness and upon the intended lifetime and storage conditions of the composition. The effectiveness of the novel acid stabilizers although in general greater than that of previously known materials, may vary within wide limits so that in some cases a stabilized composition might contain, say, as little as 0.1% by weight of the composition as stabilizer. In other cases it might be found desirable to employ up to 5% or in extreme cases, 10% on the same basis; concentrations of from 0.2, more often 0.5, to 3%, especially 1 to 2% are suitable in the main. The effectiveness of any given stabilizer may readily be tested by a standard method involving the addition of water to a stabilised dithionite under controlled conditions followed by the addition of a further quantity of the stabilised dithionite and observation of the ensuing temperature rise. Such a method is described in the examples given hereinafter.

The novel stabilisers may be easily mixed with a dithionite by known methods, mixing being as intimate as possible. If desired they may be dissolved in an organic solvent, e.g. isopropanol, which may subsequently be evaporated or distilled off. Alternatively the acid stabiliser may be mixed into the dithionite as a melt. On the other hand the additive may be incorporated into the dithionite during the last stages of dithionite manufacture instead of into the already manufactured dithionite. For example, an alcohol-wet filter cake of a dithionite may be mixed with an alcoholic solution of a novel acid stabiliser before drying in a rotary vacuum dryer. Alternatively the acid may be dissolved or dispersed in a solution or slurry of a dithionite prior to evaporation to dryness in suitable equipment. If desired a known free flowing agent such as a sodium phosphate or a sodium salt of a condensed phosphoric acid, soda ash, sodium bicarbonate, sodium benzoate, EDTA ethylenediaminetetraacetic acid or, preferably urea may be added. However, the presence of a free flowing agent will not normally be necessary.

The invention is particularly applicable in the stabilisation of sodium dithionite, but other metal dithionites, such as the potassium or calcium dithionites may be stabilised similarly. The invention is also applicable in the stabilisation of dithionite products of low strength for example sodium dithionite products containing from 50 to 90% of $Na_2S_2O_4$.

The novel compositions may be used in general in any application in which dithionites are at present used, e.g. in vat dyeing and printing, in the stripping of dyes from textiles, the reduction clearing of dyed fibres and in the bleaching of textile materials and paper pulp. The novel compositions are of particular utility because the low concentration of water soluble stabiliser generally presents no problem in the processing operation.

The invention is illustrated by the following examples. In the examples the effectiveness of various stabilisers was tested by the following method: 100g. of an intimate blend of sodium dithionite and potential stabilising material in known proportions is placed in a 250 ml. Dewar flask and 7 ml. of distilled water added in one minute by means of a metering pump, the mixture being stirred continuously during this addition. Six thermocouples are then introduced into the Dewar to enable temperature changes in various parts of the mixture to be observed, all six thermocouples being connected to a six-point recording potentiometer. After 3 minutes a further 100g. of the dithionite mixture is added to the flask and recording of the temperature of the mixture continued until it returns to ambient temperature. Mixtures were adjudged to be satisfactorily stabilised when the recorded temperature initially rose to 130°–140°C then gradually fell to the ambient value. Unsatisfactorily stabilised mixtures showed a further exotherm beyond 130°–140°C to above 200°C and in some cases burnt.

Details of the examples using the test method described are tabulated in Table I.

Table I

| Example No. | Stabiliser | Concentration of Stabiliser in Composition (%w/w) | Maximum Temp. observed |
|---|---|---|---|
| 1. | Phthalic acid | 2 | 136 |
| 2. | Phthalic anhydride | 8 | 128 |
| 3. | Isophthalic acid | 8 | 128 |
| 4. | Maleic acid | 2 | 92 |
| 5. | Maleic anhydride | 2 | 137 |
| 6. | Benzoic acid | 1 | 130 |
| 7. | Salicylic acid | 1 | 130 |

The stabilised compositions were compounded in each case by a thorough mixing of the dried ingredients. Example II A further series of tests was carried out as described in Example I using the preferred argloxy alkanoic acids as stabilizers. The results are shown in Table II.

Table II

| Example No. | Stabiliser | Concentration of Stabiliser in Composition % | Maximum Temp. observed % |
|---|---|---|---|
| 1. | Phenoxyacetic acid | 0.1 | 128 |
| 2. | 2,4,5-Trichlorophenoxyacetic acid | 2.0 | 126 |
| 3. | 4-(2,4-Dichlorophenoxy)-n-butyric acid | 0.25 | 138 |
| 4. | 2,4-Dichlorophenoxyacetic acid | 0.5 | 125 |
| 5. | 2-(2,4,5-Trichlorophenoxy) propionic acid | 0.25 | 128 |
| 6. | 2-(2,4-Dichlorophenoxy) propionic acid | 0.1 | 126 |
| 7. | 2-(4-Chloro-2-methylphenoxy) propionic acid | 1.0 | 133 |
| 8. | 4-Chloro-2-methylphenoxyacetic acid | 1.0 | 126 |

We claim:

1. A substantially anhydrous and homogeneous composition consisting essentially of a dithionite selected from sodium, potassium and calcium dithionites and from 0.1 to 10% by weight of said composition of an unsaturated carboxylic acid or an anhydride thereof.

2. A composition as claimed in claim 1 wherein said unsaturated carboxylic acid or anhydride is selected from the group consisting of fumaric acid, maleic acid and maleic anhydride.

3. A composition as claimed in claim 1 wherein said carboxylic acid is an aromatic acid comprising one or two carboxy groups attached directly to a benzene or naphthalene nucleus.

4. A composition as claimed in claim 3 wherein said carboxylic acid is selected from the group consisting of benzoic, salicylic and naphthoic acids.

5. A composition as claimed in claim 1 wherein said carboxylic acid is an aryloxy alkanoic acid of formula $ArORCO_2H$, wherein Ar is a substituted or unsubstituted aryl group and R is a substituted or unsubstituted methylene or polymethylene group.

6. A composition as claimed in claim 5 wherein said carboxylic acid is selected from the group consisting of phenoxyacetic acid, 4-chlorophenoxyacetic acid, 4-chloro-2-methylphenoxyacetic acid, 2,4-dichlorophenoxyacetic acid, 2,4,5-trichlorophenoxyacetic acid, 1-naphthoxyacetic acid, 2-naphthoxyacetic acid, 2-phenoxy propionic acid, 2-(4-chlorophenoxy) propionic acid, 2-(4chloro-2-methylphenoxy) propionic acid, 2-(2,4-dichlorophenoxy) propionic acid, 2-(2,4,5-trichlorophenoxy) propionic acid, 4-(4chloro-2-methylphenoxy)-n-butyric acid and 4-(2,4-dichlorophenoxy)-n-butyric acid.

7. A composition as claimed in claim 2 wherein said carboxylic acid has a melting point below 130°C.

8. A composition as claimed in claim 3 wherein said carboxylic acid has a melting point below 130°C.

9. A composition as claimed in claim 6 wherein said carboxylic acid has a melting point below 130°C.

10. A composition as claimed in claim 7 which further comprises a free flowing agent selected from the group consisting of sodium phosphates, sodium salts of condensed phosphoric acids, soda ash, sodium bicarbonate, sodium bonzoate, ethylenediaminetetraacetic acid and urea.

11. A composition as claimed in claim 8 which further comprises a free flowing agent selected from the group consisting of sodium phosphates, sodium salts of condensed phosphoric acids, soda ash, sodium bicarbonate, sodium benzoate, ethylenediaminetetraacetic acid and urea.

12. A composition as claimed in claim 9 which further comprises a free flowing agent selected from the group consisting of sodium phosphates, sodium salts of condensed phosphoric acids, soda ash, sodium bicarbonate sodium benzoate, ethylenediaminetetraacetic acid and urea.

13. A composition as claimed in claim 7 which comprises from 0.3 to 5% by weight of said carboxylic acid.

14. A composition as claimed in claim 8 which comprises from 0.3 to 5% by weight of said carboxylic acid.

15. A composition as claimed in claim 9 which comprises from 0.3 to 5% by weight of said carboxylic acid.

16. A substantially anhydrous and homogeneous composition consisting essentially of a dithionite selected from sodium, potassium and calcium dithionites and from 0.1 to 10% by weight of said composition of phenoxyacetic acid.

17. A composition as claimed in claim 16 which comprises from 0.3 to 5% by weight of said composition of phenoxyacetic acid.

18. A composition as claimed in claim 16 which further comprises a free flowing agent selected from the group consisting of sodium phosphates, sodium salts of condensed phosphoric acids, soda ash, sodium bicarbonate, sodium benzoate, ethylenediaminetetraacetic acid and urea.

* * * * *